A. SCOTTI.
TRACTION WHEEL.
APPLICATION FILED JAN. 11, 1922.

1,420,871.

Patented June 27, 1922.
2 SHEETS—SHEET 1.

INVENTOR:
ALFREDO SCOTTI
BY
Graham Harris
ATTORNEYS.

A. SCOTTI.
TRACTION WHEEL.
APPLICATION FILED JAN. 11, 1922.

1,420,871.

Patented June 27, 1922.
2 SHEETS—SHEET 2.

INVENTOR:
ALFREDO SCOTTI,
BY Graham Harris
ATTORNEYS.

UNITED STATES PATENT OFFICE.

ALFREDO SCOTTI, OF WHITTIER, CALIFORNIA.

TRACTION WHEEL.

1,420,871.   Specification of Letters Patent.   Patented June 27, 1922.

Application filed January 11, 1922. Serial No. 528,447.

*To all whom it may concern:*

Be it known that I, ALFREDO SCOTTI, a citizen of the United States, residing at Whittier, in the county of Los Angeles and State of California, have invented a new and useful Traction Wheel, of which the following is a specification.

My invention relates to traction devices, being more particularly a traction wheel.

The principal object of my invention is to produce a wheel of the character described of simple form and construction, which is particularly adapted for use in swampy lands, such as rich lands, although the wheel may be readily adapted for use on ground of other characters.

Other objects and advantages will be made evident hereinafter from the following description and drawings.

Referring to the drawings, which are for illustrative purposes only,

Figure 1:
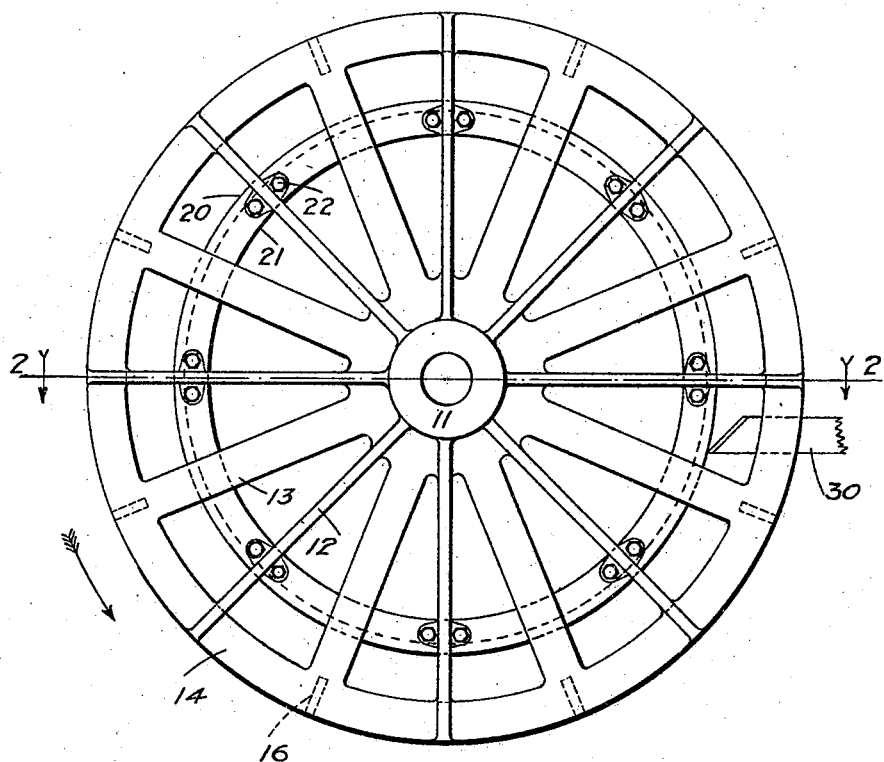
Fig. 1 is a face view of a wheel showing the same in partially assembled condition.

The wheel consists of a hub 11 from which extends outwardly a series of radially disposed spokes 12 and 13, such spokes being flat, and the plane of the flat faces of the spokes 12 being disposed at right angles to the plane of the flat faces of the spokes 13. The spokes 12 and 13 terminate at their outer ends in a circular rib 14, a second circular rib 15 being spaced apart from the rib 14 and joined thereto by a series of webs 16, preferably cast integral with the ribs and spokes. Mounted on each web 16 by suitable bolts 17 is a flight 18 consisting of a flat plate which extends outwardly beyond the ribs 14 and 15. The webs 16 and flights 18 are arranged parallel with the axis of the wheel.

Figure 4:
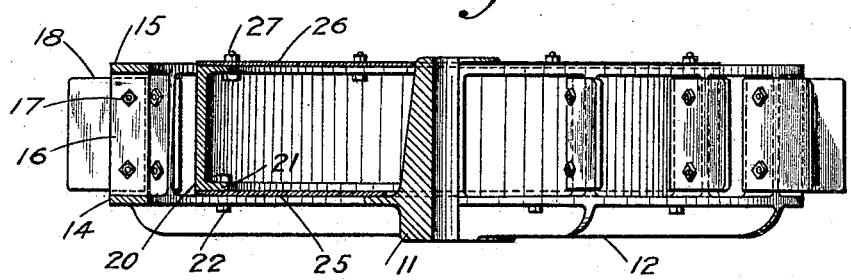
Fig. 4 is a plan view of the wheel shown in Fig. 3, partially in section.
Figure 5:
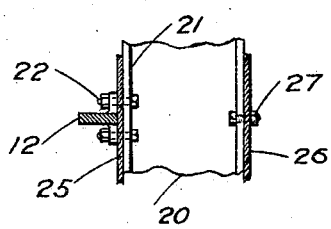
Fig. 5 is a sectional view on line 5—5, Fig. 3.

20 designates a rim of smaller diameter than the ribs 14 and 15, such rim having inwardly extending flanges 21, the flange on one side of the rim being secured by means of suitable bolts 22 to the spokes 12 so that the rim is supported upon the spokes. The rim 20 extends from the spokes across the wheel under the webs 16, being spaced apart therefrom as is clearly indicated in Figs. 2 and 4.

Figure 2:
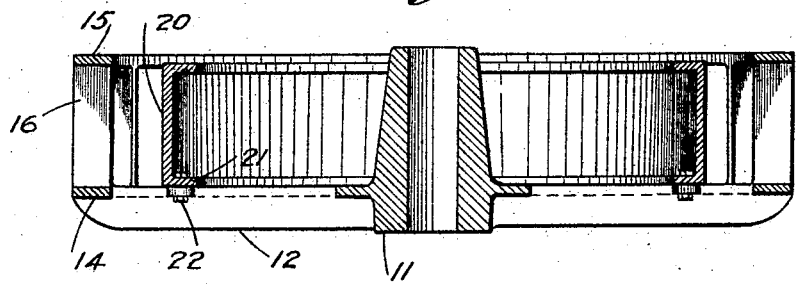
Fig. 2 is a sectional plan view on line 2—2, Fig. 1.
Figure 3:
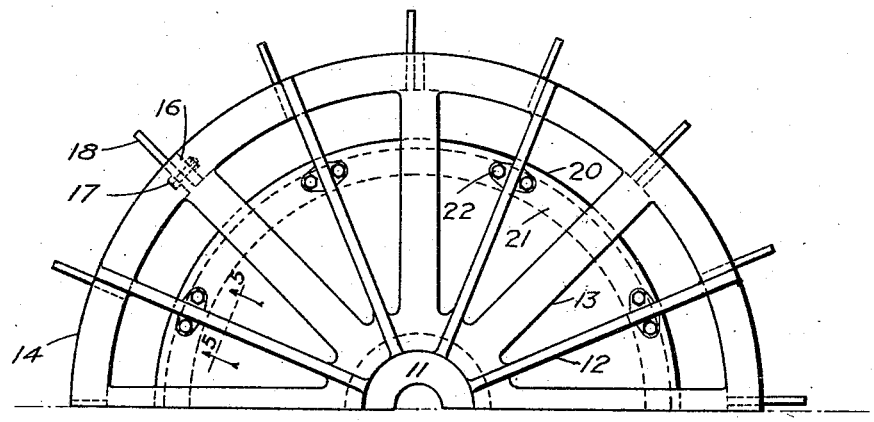
Fig. 3 is a face view of the upper half of the wheel shown in Fig. 1 in completely assembled condition.

I construct the wheel in the manner described so that it can be readily adapted for use in various kinds of soil and as shown in Figs. 1 and 2, the wheel is arranged for use in ordinary soil and, when so arranged, the flights and webs act as the traction means for the propelment of the vehicle upon which the wheel is mounted, the rim 20 only coming into contact with the surface of the ground where the wheel is used upon very dry, light soil.

When it is desired to use the wheel in swampy land, or land partially covered with water, such as is the case in rice lands, I prefer to enclose the wheel from the rim inwardly toward the hub, and, for this purpose, use circular plates 25 and 26 which are placed against the flanges 21 on the rim 20, the plate 25 being bolted thereto by the bolts 22 which attach such rim to the spokes. The plate 26 is secured to the flange on the opposite side of the rim by means of suitable bolts 27. By so constructing the wheel, a certain buoyancy is acquired, at the same time the water and light material is prevented from filling in the wheel under the rim.

It is also to be understood that in some forms of soil the wheel may be used without the flights, in which case the webs act in the same manner as the flights.

When used in sticky soil, a scraper may be used as diagrammatically illustrated at 30 in Fig. 1, such scraper being mounted in any convenient manner on the vehicle and extending across the surface of the rim as indicated.

I claim as my invention:

1. A traction wheel comprising a hub; spokes extending radially from said hub; a circular rib connecting the ends of said spokes; a second circular rib spaced apart from the first named rib; a series of webs connecting said ribs; and a flat rim secured to said spokes under said webs.

2. A traction wheel comprising a hub; a series of flat spokes extending outwardly from said hub, having their flat faces disposed in a plane extending transversely through the wheel; a circular rib connecting the outer ends of said spokes; a second circular rib spaced apart from said first named rib; a series of webs connecting said ribs; and a flat rim secured to said spokes under said webs.

3. A traction wheel comprising a hub; spokes extending radially from said hub; a circular rib connecting the ends of said spokes; a second circular rib spaced apart from the first named rib; a series of webs connecting said ribs; a flat rim secured to said spokes under said webs; and a flat plate on each side of said rim extending inwardly therefrom toward the hub.

4. A traction wheel comprising a hub; a series of flat spokes extending outwardly from said hub, having their flat faces disposed in a plane extending transversely through the wheel; a circular rib connecting the outer ends of said spokes; a second circular rib spaced apart from said first named rib; a series of webs connecting said ribs; a flat rim secured to said spokes under said webs; and a flat plate on each side of said rim extending inwardly therefrom toward the hub.

5. A traction wheel comprising a hub; spokes extending radially from said hub; a circular rib connecting the ends of said spokes; a second circular rib spaced apart from the first named rib; a series of webs connecting said ribs; a flat rim secured to said spokes under said webs; a flat plate on each side of said rim extending inwardly toward the hub; said ribs, webs and rim being disposed on one side of said spokes.

In testimony whereof, I have hereunto set my hand at Los Angeles, California, this 31st day of December, 1921.

ALFREDO SCOTTI.